United States Patent
Yang et al.

(10) Patent No.: US 7,457,379 B2
(45) Date of Patent: Nov. 25, 2008

(54) ADAPTIVE MULTI-STEP COMBINED DC OFFSET COMPENSATION FOR EDGE 8-PSK

(75) Inventors: Baoguo Yang, Iselin, NJ (US); Nelson R. Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 320 days.

(21) Appl. No.: 10/862,715

(22) Filed: Jun. 7, 2004

(65) Prior Publication Data

US 2005/0084043 A1     Apr. 21, 2005

Related U.S. Application Data

(60) Provisional application No. 60/511,947, filed on Oct. 16, 2003.

(51) Int. Cl.
    *H03D 1/04*      (2006.01)
    *H03D 1/06*      (2006.01)
    *H03K 5/01*      (2006.01)
    *H03K 6/04*      (2006.01)
    *H04B 1/10*      (2006.01)
    *H04L 1/00*      (2006.01)
    *H04L 25/08*     (2006.01)

(52) U.S. Cl. ..................... 375/346; 375/285; 327/307

(58) Field of Classification Search ................ 375/224, 375/319, 285, 346; 327/307; 455/284, 378.1, 455/226.1, 296
See application file for complete search history.

(56) References Cited

U.S. PATENT DOCUMENTS

| | | | |
|---|---|---|---|
| 6,173,011 B1 * | 1/2001 | Rey et al. | 375/233 |
| 6,269,131 B1 * | 7/2001 | Gothe et al. | 375/346 |
| 6,456,598 B1 | 9/2002 | Le Strat | |
| 6,504,884 B1 * | 1/2003 | Zvonar | 375/346 |
| 6,539,205 B1 | 3/2003 | Wan | |
| 6,661,858 B1 * | 12/2003 | Beaudin | 375/350 |

(Continued)

FOREIGN PATENT DOCUMENTS

EP      0 671 817 A     9/1995

(Continued)

OTHER PUBLICATIONS

Ariyavisitakul S. L., et al; "A Broadband Wireless Packet Technique Based on Coding, Diversity and Equalization": Universal Personal Communications 1998; (p. 363-367).

*Primary Examiner*—Jean B Corrielus
(74) *Attorney, Agent, or Firm*—Garlick Harrison & Markison; Bruce E. Garlick

(57) ABSTRACT

A method to perform DC compensation on a Radio Frequency (RF) burst transmitted between a servicing base station and a wireless terminal in a cellular wireless communication system that first receives the RF burst modulated according to either a first or second modulation format. Samples from the RF burst, taken from the training sequence, are produced and averaged to produce a DC offset estimate. The DC offset estimate is then subtracted from each of the samples. The modulation format of RF burst may then be identified from the samples. Depending on the identified modulation format, the DC offset estimate may be re-added to the samples when a particular modulation format is identified as the modulation format of the RF burst. This decision is made based on how well various components within the wireless terminal perform DC offset compensation.

29 Claims, 12 Drawing Sheets

U.S. PATENT DOCUMENTS

| | | | |
|---|---|---|---|
| 6,717,995 B2 * | 4/2004 | Zvonar | 375/340 |
| 6,748,200 B1 * | 6/2004 | Webster et al. | 455/234.1 |
| 6,801,581 B1 * | 10/2004 | Francos et al. | 375/296 |
| 6,901,121 B1 * | 5/2005 | Dubrovin et al. | 375/346 |
| 6,977,977 B1 * | 12/2005 | Dubrovin et al. | 375/346 |
| 7,050,389 B2 * | 5/2006 | Muraoka | 370/206 |
| 7,120,206 B2 * | 10/2006 | Schetelig et al. | 375/319 |
| 2002/0064239 A1 * | 5/2002 | Husth | 375/319 |
| 2002/0186761 A1 | 12/2002 | Corbaton | |
| 2005/0084039 A1 * | 4/2005 | Kocic et al. | 375/319 |

FOREIGN PATENT DOCUMENTS

| | | |
|---|---|---|
| EP | 1 033 852 A1 | 2/1999 |
| EP | 1 176 750 A | 1/2000 |
| GB | 2 341 296 A | 3/2000 |
| WO | WO 00/69023 | 11/2000 |
| WO | WO 01/33792 A1 | 5/2001 |
| WO | WO 02/071608 A1 | 9/2002 |

* cited by examiner

ADAPTIVE MULTI-STEP COMBINED DC OFFSET COMPENSATION FOR EDGE 8-PSK

CROSS REFERENCE TO RELATED APPLICATIONS

This application claims priority to U.S. Provisional Patent Application Ser. No. 60/511,947, filed Oct. 16, 2003, which is incorporated herein by reference for all purposes.

BACKGROUND

1. Technical Field

The present invention relates generally to cellular wireless communication systems, and more particularly to a system and method to perform DC compensation on a radio frequency (RF) burst in a cellular wireless network.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 20 ms frame that is divided into four sub-frames, each including eight slots of approximately 625 µs in duration. Each slot corresponds to a Radio Frequency (RF) burst having a left side, a midamble, and a right side. The midamble typically contains a training sequence whose exact configuration depends on modulation format used. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless terminals must be able to identify the modulation format of any RF burst for successful demodulation and receipt of the RF burst. Further, the modulation format used may cause the processing of the RF burst to vary and requires different signal and channel conditions. For example, the SNR/SIR requirements of the GMSK and 8PSK formats may vary. The 8PSK format needs a higher SNR being associated with the processed RF burst. More robust modulation schemes, such as GMSK, are typically used for noisy channels. Less robust modulation schemes, such as 8PSK, are typically used in less noisy channels. As 8PSK is more sensitive to DC offset and DC offset may vary significantly from one RF burst to another, simple averaging of the received signal over multiple bursts does not adequately estimate the DC offset when using the 8PSK modulation scheme. Therefore, a need exists for improved DC offset compensation for 8PSK. Additionally, different processes may be desired to process signals having different modulation formats.

Furthermore, proper DC offset compensation is crucial for direct conversion (or homodyne) receiver (DCR) architecture. The main feature of DCR is the down-conversion of the radio signal to baseband without any use of intermediate frequencies (IF). The removal of IF would reduce component counts as the need for an IF SAW filter or a second local oscillator for the second frequency translation is eliminated within a smaller form factor. Unfortunately, DCR architectures suffer from DC offset that is a by-product of the direction conversion process. Three main sources for DC offset exist in RF circuits as follows: (1) Local oscillator (LO) signal leaking to, and reflecting off, the antenna and self-down converting to DC through the mixer, (2) a larger near-channel interferer which is leaking into the LO and which also downconverts to DC, and (3) transistor mismatch in the signal path. The leakage due to (2) and (3) can be reduced to some extent by careful front-end design. Nevertheless, if the DC offset is not completely eliminated in the receiver front-end, then the remaining DC offset has to be taken care of in the baseband processing.

While the training sequence assists in processing the RF burst, properly selecting and processing the RF burst according to the modulation format, particularly in an environment where the modulation format may vary is problematic. The wireless terminal needs to immediately identify the modulation format in order to properly process the RF burst and effect proper communications. Thus, a need exists for a means to quickly and efficiently identify the modulation format for the wireless terminal without the wireless terminal performing unnecessary data processing. Once the modulation format is identified, the proper methodology to process the RF burst, including how to perform DC offset compensation, must be quickly effected. When the modulation format is identified as being 8PSK, a need exists for improved estimation of the DC offset as 8PSK is more sensitive to DC offset and the DC offset within 8PSK varies significantly from one RF burst to another. Therefore, a need exists for improved adaptive DC offset compensation methodology for use with the 8PSK modulation scheme.

BRIEF SUMMARY OF THE INVENTION

In order to overcome the shortcomings of prior devices, the present invention provides a system and method to perform DC compensation on a radio frequency (RF) burst transmitted between a servicing base station and a wireless terminal in a cellular wireless communication system. This method involves receiving the RF burst and converting the RF burst to a baseband signal. Typically, each data block includes 4 radio frequency (RF) bursts, where each of the 4 RF bursts use the same modulation format. The RF burst is modulated according to a modulation format such as GMSK, 8PSK, or other like modulation formats known to those skilled in the art. Samples from a baseband signal are produced and averaged to produce an average DC offset estimate. Next, a circle-fitting (CF) DC offset estimate and a linear minimum mean square error (LMMSE) DC offset estimate is produced from the baseband signal. The average DC offset estimate, CF DC offset estimate, and LMMSE DC offset estimate combine to produce a combined DC offset estimate. Then the combined DC offset estimate is then subtracted from each of the baseband signal.

In one implementation, the CF DC offset estimate and LMMSE DC offset estimate may be combined sequentially. Alternatively, the average DC offset estimate, CF DC offset estimate, and LMMSE DC offset estimate may be combined based on the best linear unbiased estimator (BLUE) criterion. Alternatively, the average DC offset estimate, CF DC offset estimate, and LMMSE DC offset may be adaptively combined based on the signal-to-interference ratio (SIR) estimate.

Yet another embodiment takes the form of a DC offset compensator that removes the DC offset from an input signal such as a baseband signal. The DC offset compensator includes multiple stages. In one embodiment, an average DC estimation and correction stage receives an input or baseband signal and performs DC average compensation. Next, a CF estimation and correlation stage operably coupled to the average DC estimation and correction stage performs CF DC offset compensation on the output of the average DC estimation and correction stage. Further still, a LMMSE DC estimate and SIR estimation stage further performs LMMSE DC offset compensation on the output of the CF estimation and correction stage. These outputs from the average DC estimation and correction stage, CF estimation and correction stage, LMMSE DC estimation and SIR estimation stage are combined within a combined DC estimation and correction stage to produce a combined DC offset based on these inputs.

The combined DC estimation and correction stage may combine the CF DC offset estimate and LMMSE DC offset estimate sequentially. Alternatively, the average DC offset estimate, CF DC offset estimate, and LMMSE DC offset estimate may be combined based on the best linear unbiased estimator (BLUE) criterion. Alternatively, the average DC offset estimate, CF DC offset estimate, and LMMSE DC offset may be adaptively combined based on the signal-to-interference ratio (SIR) estimate.

Another embodiment of the present invention provides a wireless terminal that operates within a cellular communication system. This wireless terminal has an RF front end, a baseband processor communicatively coupled to the RF front end, and an encoder/decoder (CODEC) processing module which if present is communicatively coupled to the baseband processor. These combinations of elements operate to receive a first RF burst, which may be modulated according to either a GMSK or 8PSK modulation format. The combination then produces a baseband signal from the first RF bursts. Samples from the baseband signal are averaged to produce an average DC offset estimate. Next, a circle-fitting (CF) DC offset estimate and a linear minimum mean square error (LMMSE) DC offset estimate is produced from the baseband signal. The average DC offset estimate, CF DC offset estimate, and LMMSE DC offset estimate combine to produce a combined DC offset estimate. Then the combined DC offset estimate is then subtracted from each of the baseband signal. Yet another implementation provides a DC offset compensator to determine and remove the DC offset from an input signal. The DC offset compensator includes multiple stages. First an average DC estimate and correction stage initially receives the input signal and performs DC average compensation. Next, a circle fitting (CF) estimation and correction stage, operably coupled to the average DC estimate and correction block, performs CF DC offset compensation on an output of the average DC estimate and correction stage. A LMMSE DC estimation and signal to interference ratio (SIR) estimation stage performs LMMSE DC offset compensation on the output of the CF estimation and correction stage. Finally, a combined DC estimation and correction stage, combines the output of the CF estimation and correction stage and the output of the LMMSE DC estimation and SIR estimation stage to produce a combined DC offset estimate.

Other features and advantages of the present invention will become apparent from the following detailed description of the invention made with reference to the accompanying drawings.

DETAILED DESCRIPTION OF THE DRAWINGS

Figure 1:
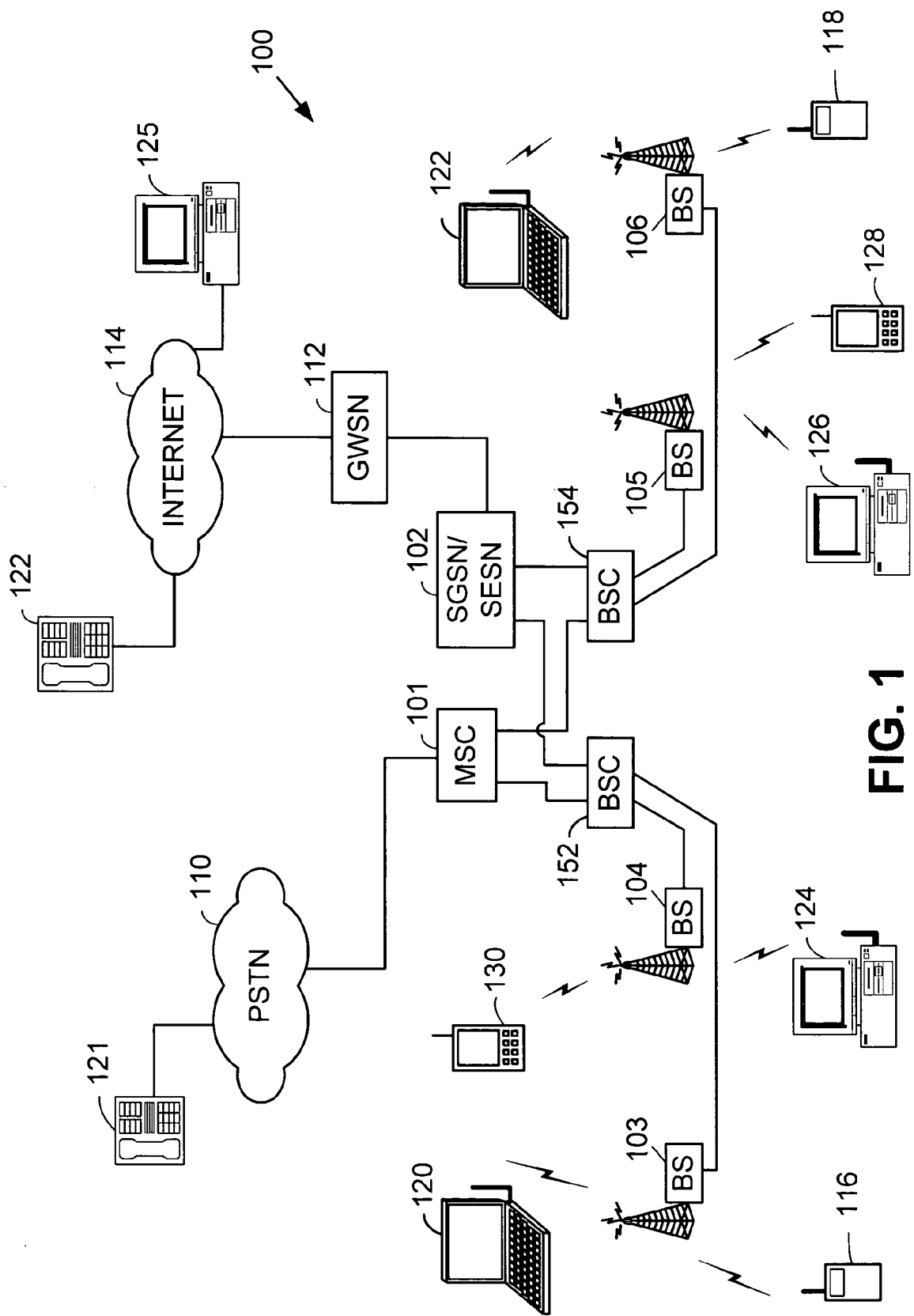
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

In particular, the wireless terminals 116-130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
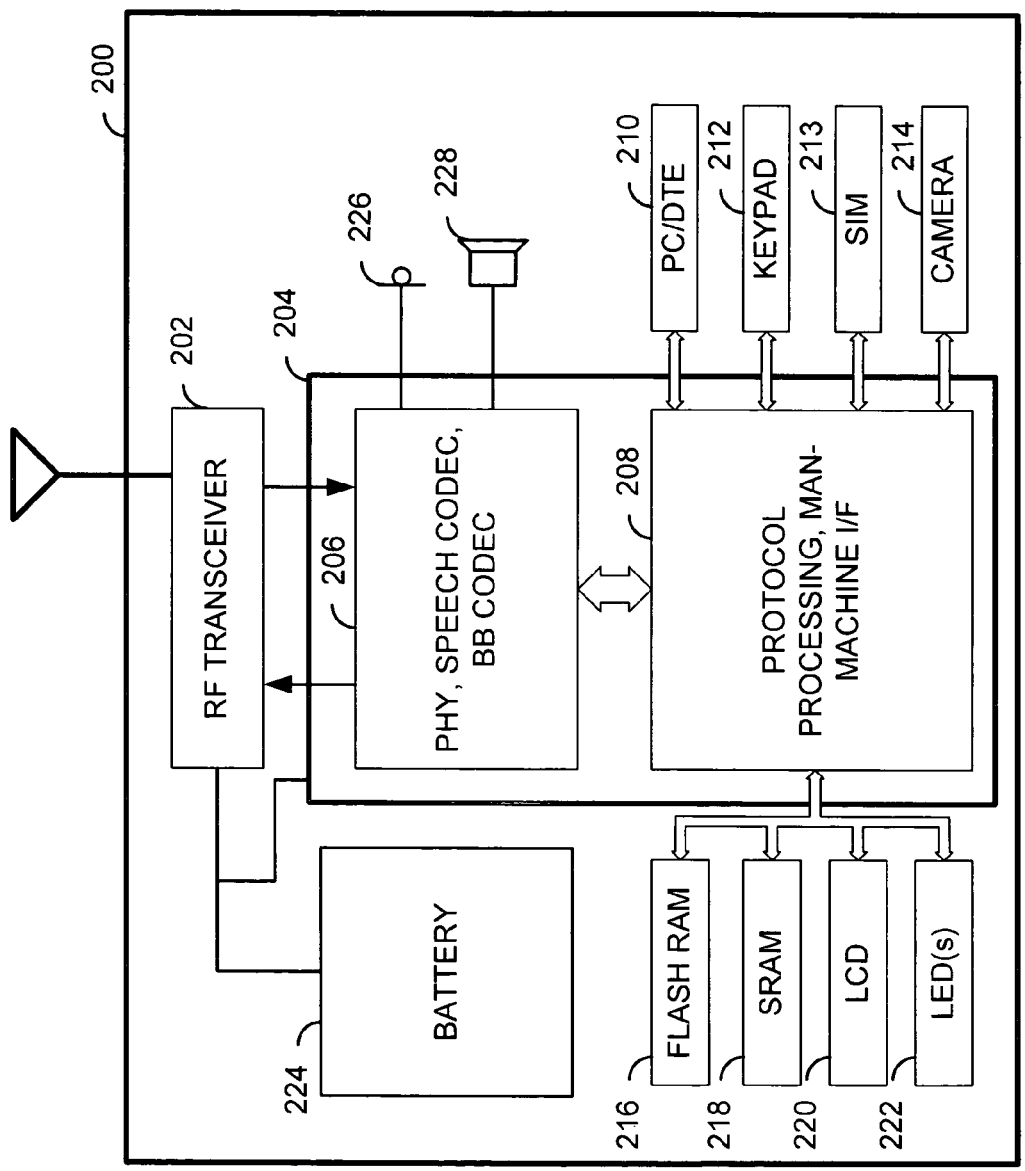
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DEcoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
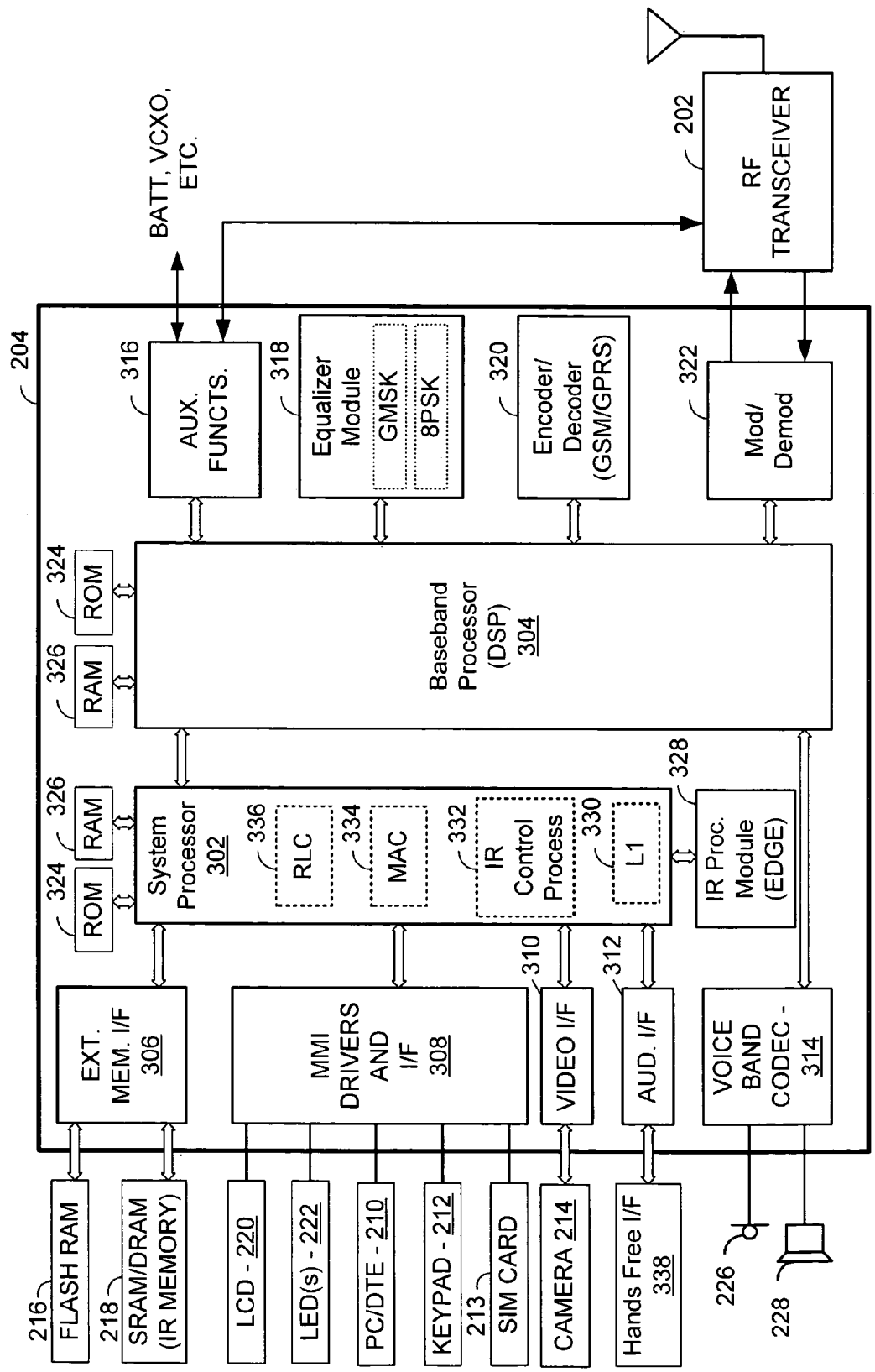
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5-6B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
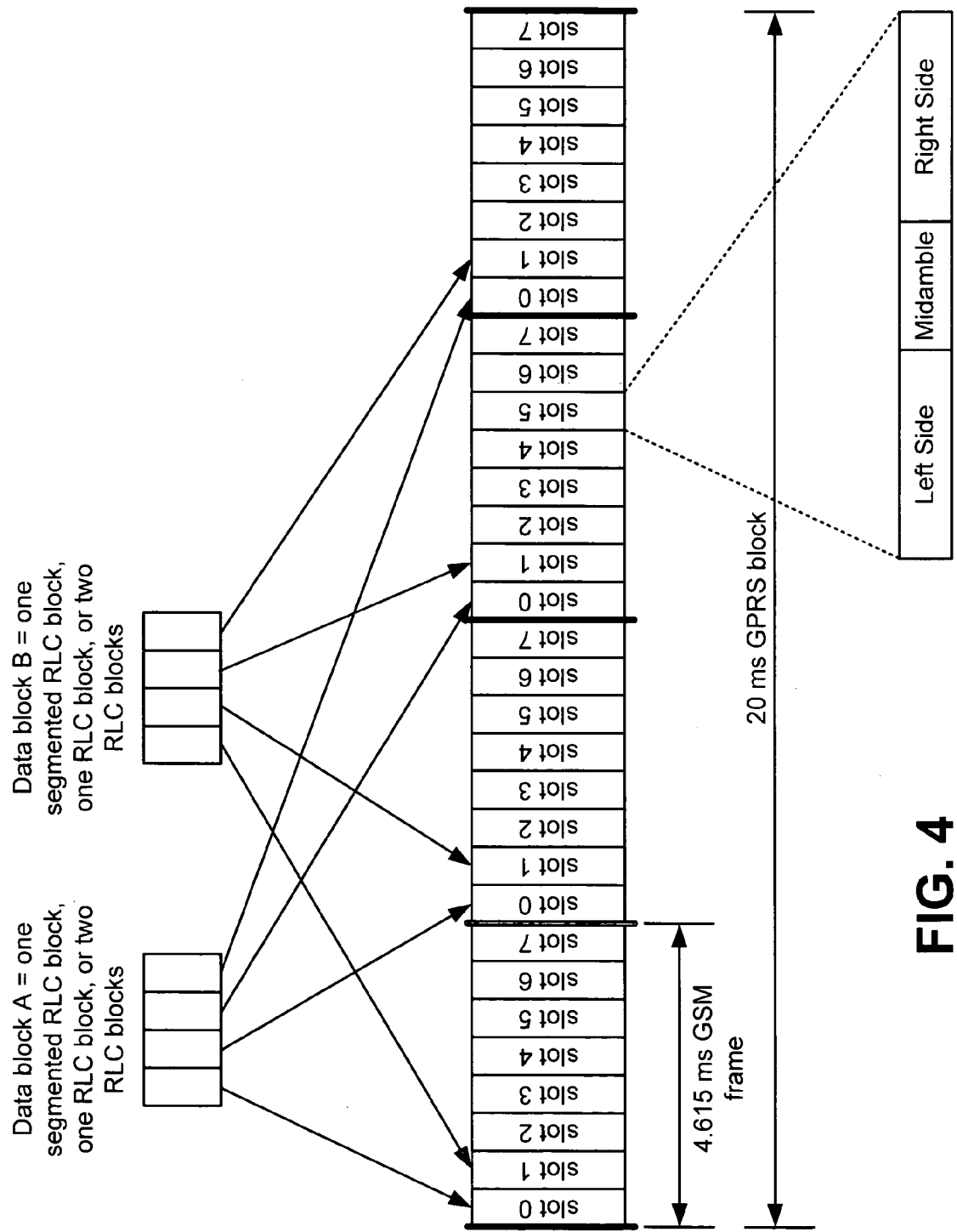
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 μs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1-7 of each sub-frame, may differ. As will be described further with reference to FIG. 5, the wireless terminal 200 may be assigned multiple slots for forward link transmissions that must be received and processed by the wireless terminal 200.

Figure 5:
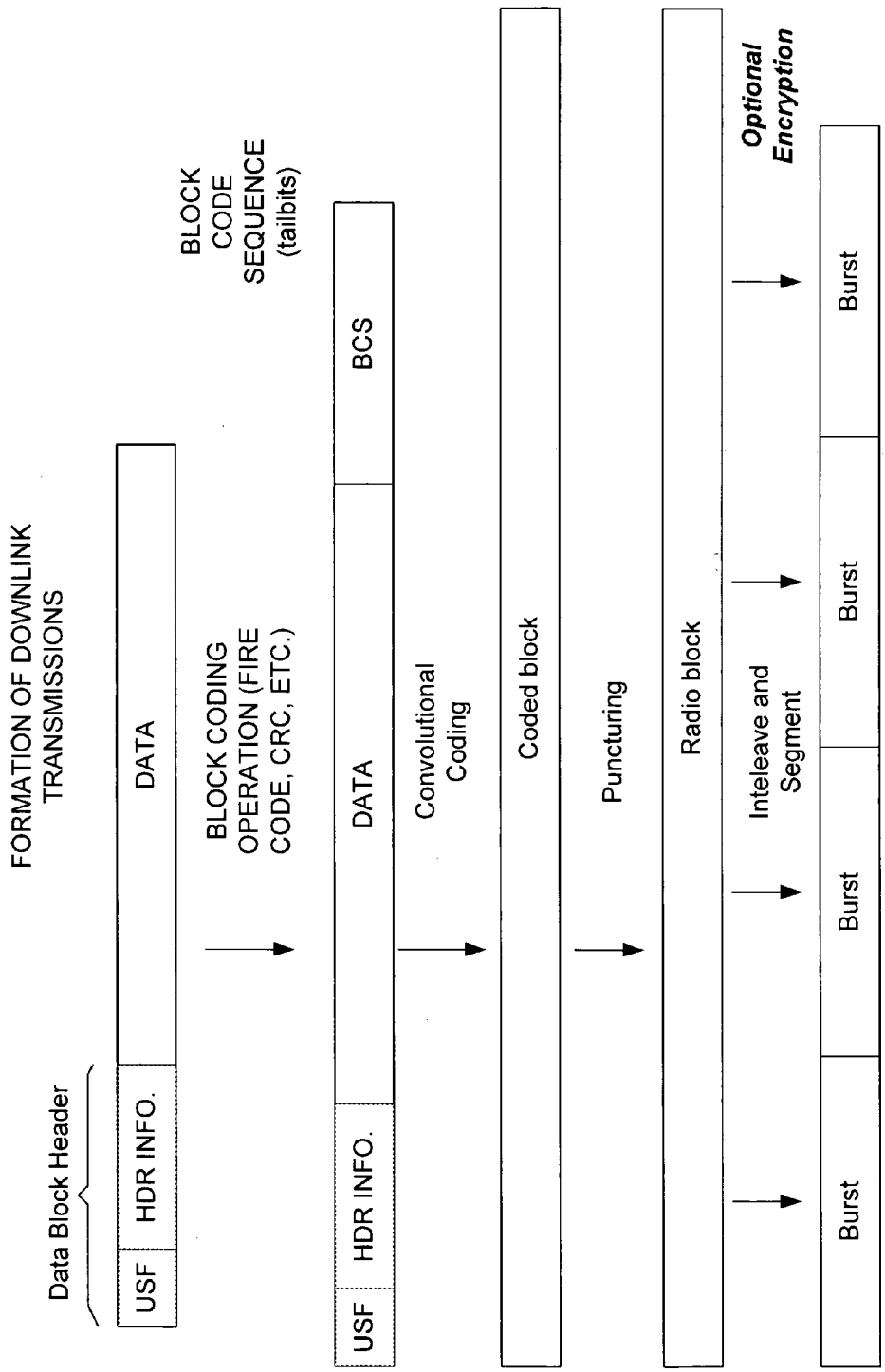
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format. Different methods of determining the modulation format from the training sequence will be described in FIGS. 6A through 10.

Figure 6A:
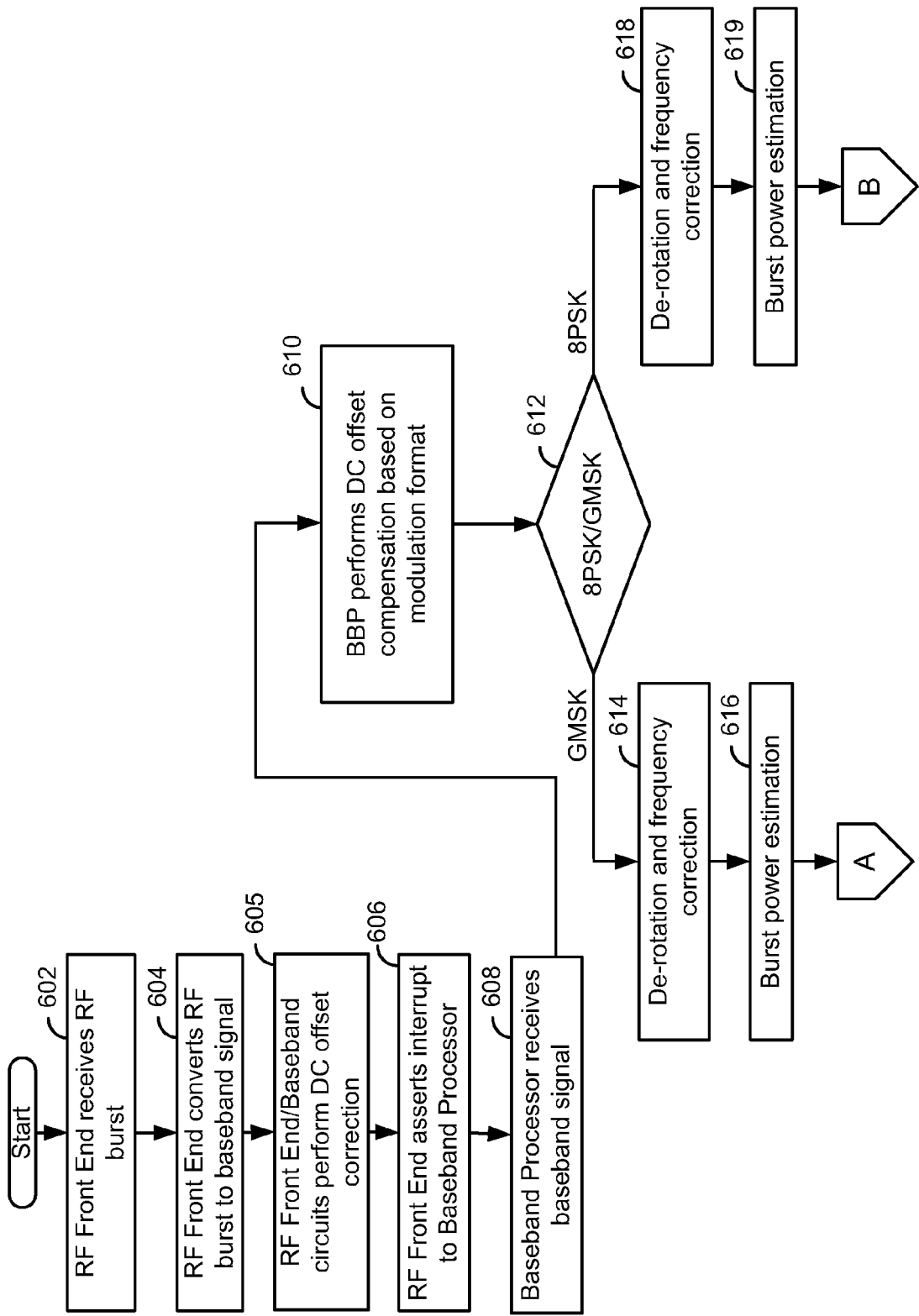
FIGS. 6A and 6B are flow charts illustrating operation of a wireless terminal in receiving and processing a RF burst.
Figure 6B:
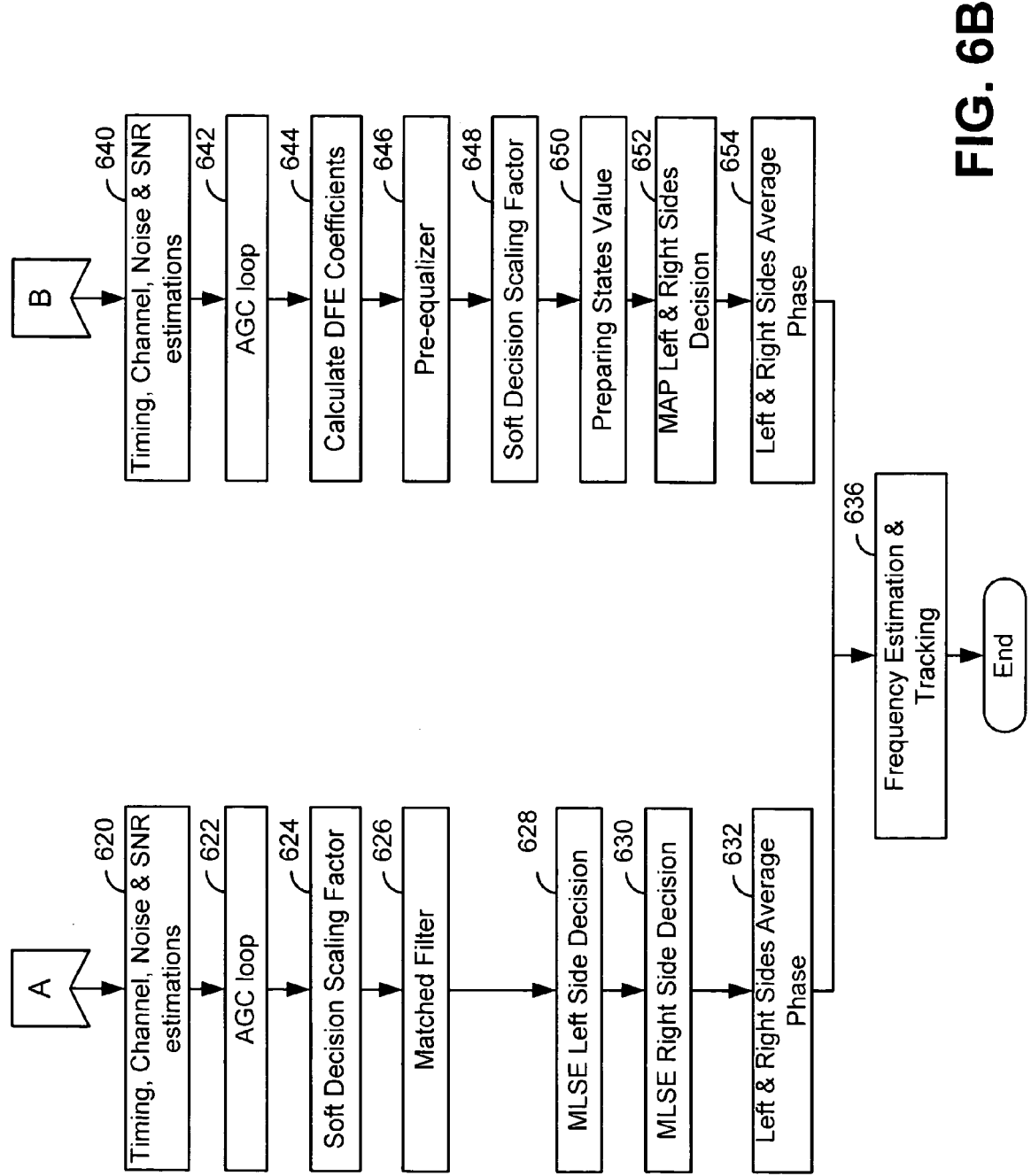

FIGS. 6A and 6B are flow charts illustrating operation of a wireless terminal 200 in receiving and processing a RF burst. The operations illustrated in FIG. 6A to 6B correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions illustrated in FIGS. 6-9.

Referring particularly to FIG. 6A, operation commences with the RF front end 202 receiving an RF burst in a corresponding slot of a GSM frame (step 602). The RF front end 202 then converts the RF burst to a baseband signal (step 604). RF front end 202 or baseband circuits performs DC offset compensation on all incoming RF signals in step 605. If RF front end uses direct conversion receiver (DCR) architecture or the SNR is low, RF front end 202 does not perform well for DC offset compensation and baseband processor 304 must assist in the DC offset compensation as shown in step 610 and detailed in FIG. 8A. Upon completion of the conversion, the RF front end 202 sends an interrupt to the baseband processor 304 (step 606). Thus, as referred to in FIG. 6A, the RF front end 202 performs steps 602-606.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 determines the modulation format prior to step 610. In one particular embodiment according to the GSM standard, the modulation format will be either Gaussian Minimum Shift Keying (GMSK) modulation or Eight Phase Shift Keying (8PSK) modulation. The baseband processor 304 makes the determination and performs additional DC offset compensation in step 610 based on the identified modulation format. Processing then proceeds along one of two branches based upon the detected modulation format. GMSK is more robust for DC offset than 8PSK. A simple average method over one burst may work well for GMSK modulation, but such a method can cause significant decision errors for 8PSK. Moreover, the DC offset can change significantly from one RF burst to another, so the average over multi-bursts could not work for 8PSK either. 8PSK needs the more complex DC compensation method. In order to address this need, an adaptive multi-step DC offset estimation and compensation may be employed. The main algorithm in this multi-step scheme is the linear minimum means square error (LMMSE) DC offset estimator which will be discussed in FIG. 8B and following.

For GMSK modulation, the baseband processor 304 performs de-rotation and frequency correction of the baseband signal (step 614). Next, the baseband processor 304 performs burst power estimation of the baseband signal (step 616). Referring now to FIG. 6B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608-626 are referred to hereinafter as pre-equalization processing operations. With the baseband processor 304 performing these pre-equalization processing operations on the baseband signal, baseband processor 304 produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation. The equalizer module 318 receives the processed baseband signal, settings, and/or parameters from the baseband processor 304 and performs Maximum Likelihood Sequence. Estimation (MLSE) equalization on the left side of the baseband signal (step 628). As was shown previously with reference to FIG. 4, each RF burst contains a left side of data, a midamble, and a right side of data. The midamble includes predefined training sequence that may be based on the modulation format. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 6A, the baseband processor 304 and equalizer module 318 take the right branch from decision point 612 when an 8PSK modulation is detected at step 610. In the first operation for 8PSK modulation, the baseband processor 304 performs de-rotation and frequency correction on the baseband signal (step 618). The baseband processor 304 then performs burst power estimation of the baseband signal (step 619). Referring now to FIG. 6B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 618-648 performed by the baseband processor 304 are referred to herein as "pre-equalization processing" operations for an 8PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the receiver. (Step 636) The operations of steps 654 and 636 are referred to as post-equalization processing operations. From step 636, operation is complete for the particular RF burst depicts the various stages associated with recovering a data block from an RF Burst.

While the operations of FIGS. 6A and 6B are indicated to be performed by particular components of the wireless terminal, such segmentation of operations could be performed by differing components. For example, the equalization operations could be performed by the baseband processor 304 or system processor 302 in other embodiments. Further, the baseband processor 304 or the system processor 302 in other embodiments could also perform decoding operations.

Figure 7:
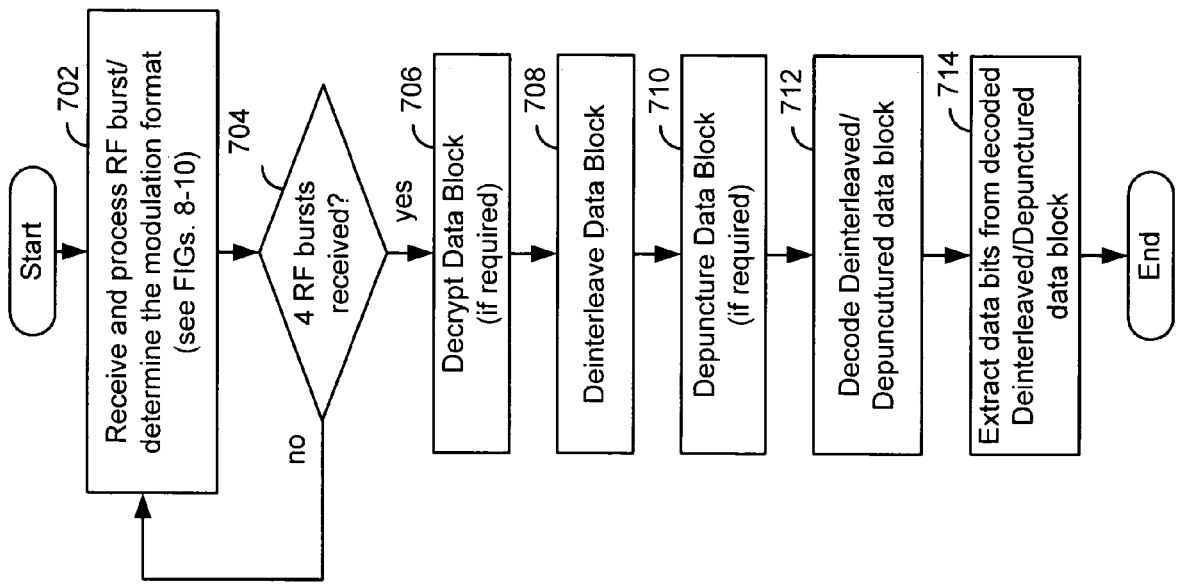
FIG. 7 is a flow chart illustrating operations to recover a data block according to an embodiment of the present invention.

FIG. 7 is a flow chart illustrating operations to decode a data block according to an embodiment of the present invention. Operations commence with receiving and processing an RF burst in step 702 and as described with reference to FIGS. 6A and 6B. This includes determining the modulation format in order to properly demodulate the RF burst(s). After receiving the four RF bursts that complete an EDGE or GPRS data block, as determined at step 704, operation proceeds to step 706.

A header of the data block identifies the coding scheme and puncturing pattern of the data block. For example, the coding scheme may be any one of the CS-1 through CS-4 or MCS-1 through MCS-9 coding schemes, each of which may include multiple puncturing patterns. Operation according to the present invention uses the training sequence of each RF burst, located within the midamble of the RF burst, to identify the modulation format of the RF burst.

Data recovery begins in step 706 where, if necessary, the data block is decrypted. The data block is then de-interleaved (step 708) according to a particular format of the data block, e.g.. MCS-1 through MCS-9 or CS-1 through CS-4. The data block is then de-punctured (step 710). At step 712, the de-interleaved and de-punctured data block is decoded. Decoding operations may include combining previously received copies of the data block with the current copy of the data block. Data bits of the decoded data block are then extracted and processed further (step 714).

Figure 8A:
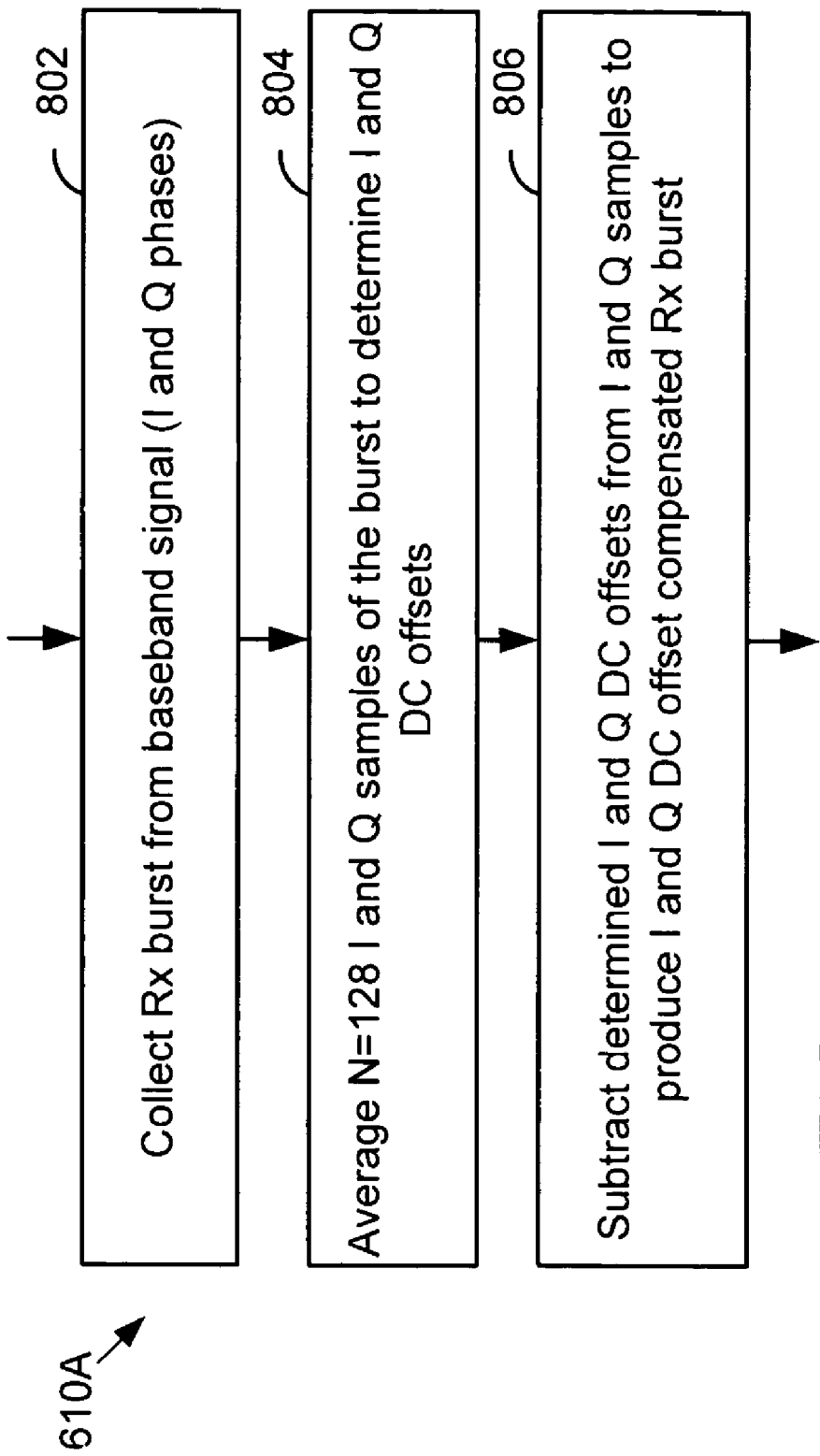
FIGS. 8A and 8B are flow charts illustrating DC offset compensation operations based on the detected the modulation format of the RF burst.

FIG. 8A provides in further detail a description of how the baseband processor performs the DC offset compensation for an GMSK signal of step 610 as shown in FIG. 6A. Here in step 802, a number of data samples are extracted from the baseband signal. In one embodiment this may constitute the first 128 I and Q samples of the RF Burst. These samples may be extracted from the data portions of the RF Burst. Another embodiment may extract the training sequence from the baseband signal. The I phase and Q phase of the data samples are averaged to produce I phase and Q phase DC offsets in step 804. In step 806, the I and Q DC offsets are subtracted from the I and Q data samples to produce I and Q DC offset compensated data samples.

Figure 8B:
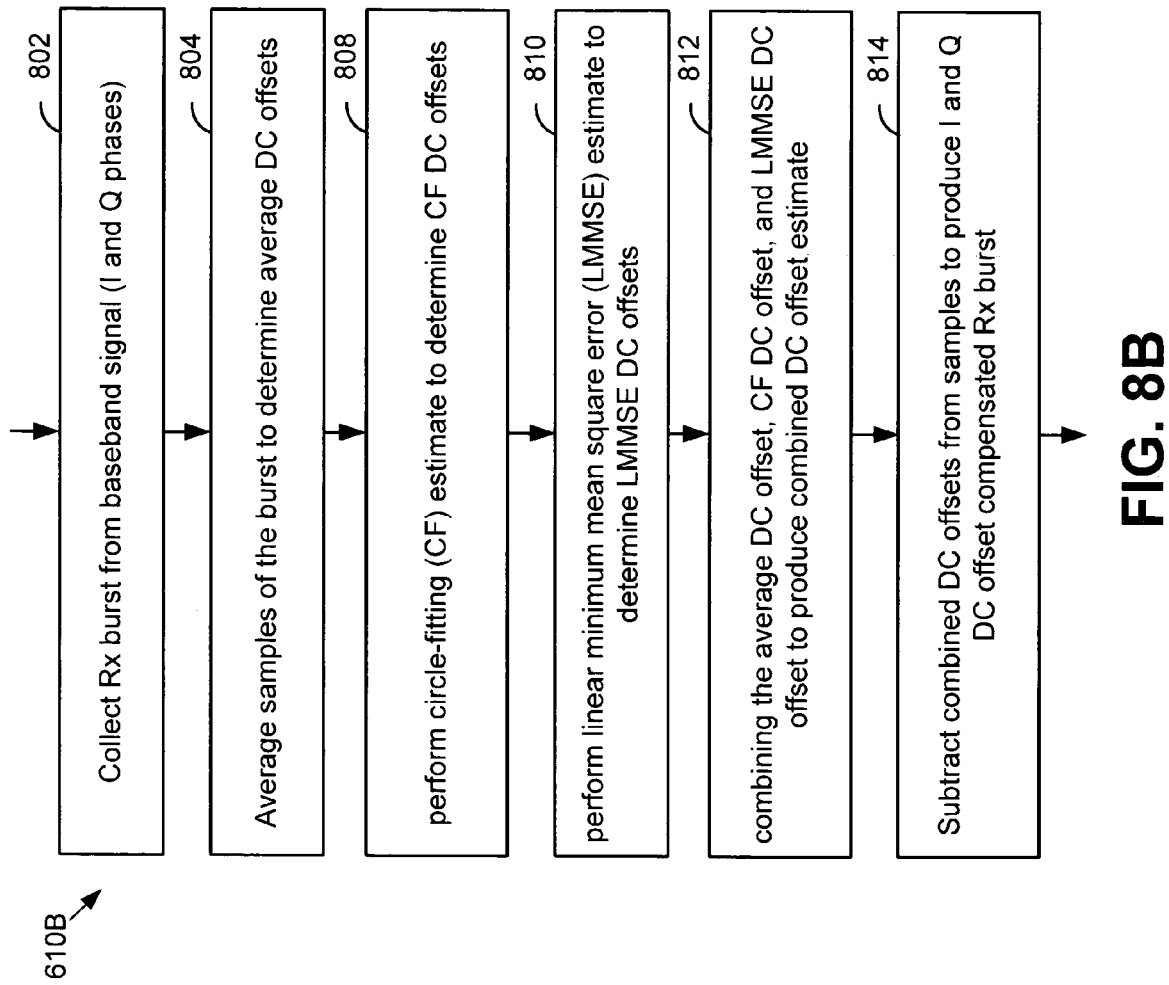

FIG. 8B details step 610B of FIG. 6A further. Here the baseband processor performs the DC offset compensation for an 8PSK signal. In one embodiment, this may constitute the collection of the bursts from the baseband signal in Step 802 to include the I and Q phases. Next, samples of the bursts are averaged to determine the average DC offsets in Step 804 as was previously done in FIG. 8A for a GMSK modulated signal. Next, for an 8PSK signal, circle-fitting (CF) is performed in order to determine the CF DC offsets in Step 808. After determining the CF DC offsets, the LMMSE is estimated to determine the LMMSE DC offsets in Step 810. The average DC offset from Step 804, circle fitting DC offset from Step 808, and LMMSE DC offset from Step 810 are then combined to produce a combined DC offset estimate in Step 812. In Step 814, the combined DC offset is then subtracted from the samples to produce a DC offset compensated RF burst. Although this methodology provides improved results for DC offset compensation of 8PSK signals, this methodology may be applied to other modulation formats, including but not limited to GMSK, as well.

Figure 9:
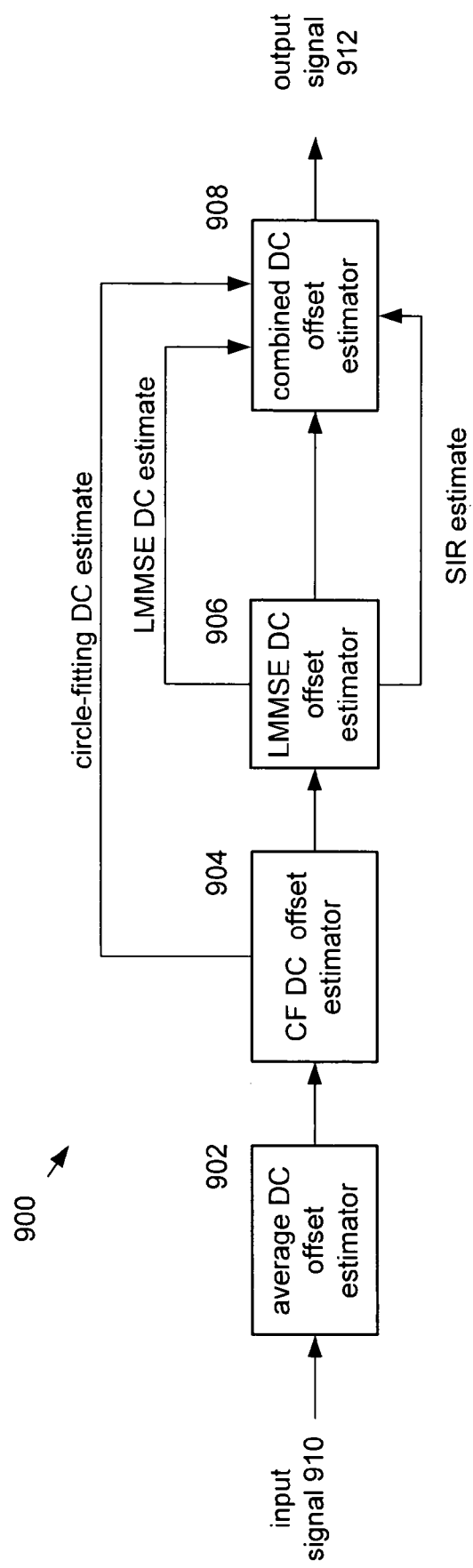
FIG. 9 is a block diagram illustrating a multi-step combined DC offset compensator constructed according to the present invention.

FIG. 9 is a block diagram illustrating a multi-step combined DC offset compensator 900 constructed according to an embodiment of the present invention. In this implementation, the multi-step combined DC offset compensator includes an average DC estimate and correction block 902, a circle fitting (CF) estimation and correction block 904, a linear minimum mean square error (LMMSE) DC estimation and signal to interference ratio estimation block 906, and a combined DC estimation and correction block 908. The multi-step combined DC offset compensator 900 receives an input signal 910 and removes a combined DC offset from input signal 910 to produce output signal 912. Alternately, the multi-step combined DC offset compensator receives the input signal and produces an offset signal that may applied to the input signal to remove the DC offset from the input signal.

Samples from baseband signal serve as input signal 910 to average DC estimate and correction block 902. In average DC estimate and correction block 902 input signal is averaged to produce an average DC offset estimate. The output of average DC estimate and correction block 902 serves as the input for a CF estimation and correction block 904. Next in CF estimation and correction block 904, a circle-fitting (CF) DC offset estimate is produced from the baseband signal. This then serves as the input to LMMSE DC offset estimator 906.

Then, the average DC offset estimate, CF DC offset estimate, and LMMSE DC offset estimate combine to produce a combined DC offset estimate within combined DC estimator 908. Then the combined DC offset estimate (output signal 912) is then subtracted from the baseband signal.

In one implementation, the CF DC offset estimate and LMMSE DC offset estimate may be combined sequentially. Alternatively, the average DC offset estimate, CF DC offset estimate, and LMMSE DC offset estimate may be combined based on the best linear unbiased estimator (BLUE) criterion. Alternatively, the average DC offset estimate, CF DC offset estimate, and LMMSE DC offset may be adaptively combined based on the signal-to-interference ratio (SIR) estimate.

In another embodiment, the functional blocks of FIG. 9 take the form of a DC offset compensator circuit that removes the DC offset from an input signal such as a baseband signal. The DC offset compensator includes multiple stages or circuits that correspond to functional blocks 902, 904, 906, and 908. The combined DC estimation and correction functional block and corresponding circuit may combine the CF DC offset estimate and LMMSE DC offset estimate sequentially. Alternatively, the average DC offset estimate, CF DC offset estimate, and LMMSE DC offset estimate may be combined based on the BLUE criterion. Alternatively, the average DC offset estimate, CF DC offset estimate, and LMMSE DC offset may be adaptively combined based on the SIR estimate.

Referring back to FIG. 2, another embodiment provides a wireless terminal 200 whose elements operate to receive a first RF burst, which may be modulated according to either a GMSK or 8PSK modulation format. The wireless terminal then produces a baseband signal from the first RF bursts as depicted in FIG. 6A. Samples from the baseband signal are averaged to produce an average DC offset estimate as shown in FIGS. 8A and 8B. Next, a CF DC offset estimate and LMMSE DC offset estimate are produced from the baseband signal as described in association with FIGS. 8B and 9. The average DC offset estimate, CF DC offset estimate, and LMMSE DC offset estimate combine to produce a combined DC offset estimate. Then the combined DC offset estimate is then subtracted from each of the baseband signal.

The main algorithm in the multi-step scheme is the LMMSE DC offset estimator. The LMMSE estimator can exploit a-priori knowledge about the modulation and receive filters, and the statistics of DC and channel, to perform better than a least square (LS) method despite LMMSE also being a linear method. The average DC offset estimation and CF DC offset estimation serve as the first and second compensation stages, respectively, before LMMSE.

The CF stage serves two functions. First, the CF estimator offers improved performance over the average DC offset. Therefore, the CF stage can provide an improved initial estimate for LMMSE stage. The LMMSE DC algorithm performance depends on the input DC offset value. By sequentially applying these methods, better performance is observed as reflected in FIG. 10. Second, CF works on random data, while LMMSE is based on training sequence (TR), so CF and LMMSE have a small correlation. This small correlation allows the results of CF and LMMSE to be combined based on best linear unbiased estimator (BLUE) criterion to yield a better DC offset estimate. However, CF and LMMSE both depend on signal to interference ratio (SIR). Thus, CF and LMMSE results should be adaptively combined based on SIR. Simulation results show that the proposed algorithm can reduce the degradation of DC from 1.1 dB to 0.6 dB for MCS5 and from 3.3 dB to 2.0 dB for MCS9 in TU50noFH compared with LS method.

As previously stated, the multi-step combined DC offset methodology has three stages: 1) DC average compensation, 2) CF DC offset compensation, and 3) LMMSE DC offset compensation. These three steps may be applied sequentially, so the DC offset can be reduced. The results may also combine to yield a final or combined DC offset correction. The following subsections derive the CF DC offset estimation; LMMSE DC offset estimation, and BLUE combination algorithms.

Constant envelope modulation schemes such as GMSK have the modulation constellation points located within a circle. This property allows the estimation of a DC offset based on this property. A least-square (LS) error criterion for circle fitting is given by the following equation:

$$\sum_{i=0}^{N-1}(R(i)^2 - \rho^2)^2 = \min$$

where $$R(i) = \sqrt{(r_x(i) - v_x)^2 + (r_y(i) - v_y)^2}$$

$r_x(i)$ and $r_y(i)$ are the I/Q samples of ADC output (the x-y coordinates of the ith data point), $v_x$ and $v_y$ are the I/Q DC offsets (the coordinates of the center), $N \geq 3$ is the number of samples, and $\rho$ is the radius of target circle that can minimize the error.

The solution of the optimization problem is given as follows:

$$v_x = -\frac{t\_He * t\_ff - t\_Hf * t\_ef}{-2 * t\_ee * t\_ff + 2 * t\_ef * t\_ef}$$

$$v_y = -\frac{t\_Hf * t\_ee - t\_He * t\_ef}{-2 * t\_ee * t\_ff + 2 * t\_ef * t\_ef}$$

$$\rho^2 = \frac{1}{N}\sum_{k=0}^{N-1} R(k)^2$$

where $$t\_He = \sum_{i=0}^{N-1} H(i) \cdot e(i)$$

$$t\_Hf = \sum_{i=0}^{N-1} H(i) \cdot f(i)$$

$$t\_ef = \sum_{i=0}^{N-1} e(i) \cdot f(i)$$

$$t\_ee = \sum_{i=0}^{N-1} e(i)^2$$

$$t\_ff = \sum_{i=0}^{N-1} f(i)^2$$

$$e(i) = r_x(i) - \frac{1}{N}\sum_{k=0}^{N-1} r_x(k)$$

$$f(i) = r_y(i) - \frac{1}{N}\sum_{k=0}^{N-1} r_y(k)$$

$$H(i) = r_x(i)^2 + r_y(i)^2 - \frac{1}{N}\sum_{k=0}^{N-1}(r_x(k)^2 + r_y(k)^2)$$

When the signal of constant envelope modulation passes through an inter-symbol interference (ISI) channel, or for the signal of non-constant envelope modulation such as $$\frac{3\pi}{8} 8PSK,$$

the constellation of received samples is not a circle. Although the circle-fitting algorithm does not work well in these conditions, the performance of the circle-fitting algorithm still exceeds that of a simple average method. Furthermore, the algorithm does not need to know the transmitted data, so the circle-fitting algorithm is a non-data-aided algorithm. There is one parameter, N, the number of samples, in the algorithm. Choosing 64 samples to the left and 64 samples to the right of the training sequence can improve the performance of a worst case training sequence. In addition, choosing the samples in this way can make the estimate of CF algorithm more independent of an estimate based on training sequence.

The LMMSE methodology considers the training sequence. At the transmitter, the mid-amble can be represented as follows:

$$x(t) = a(t) \otimes C_0(t)$$

where $$a(t) \text{ is the } \frac{3\pi}{8}$$

continuously rotated training symbols, $C_0(t)$ is the linearized GMSK pulse, $\otimes$ stands for convolution.

The signal passes through a fading channel represented as:

$$h(t) = \sum_{k=0}^{M-1} \alpha_k \delta(t - \tau_k)$$

where M is the number of paths, and $\alpha_k$ are the zero-mean complex Gaussian random variables with power delay profile $\theta(\tau_k)$.

Assuming uniform power-delay profile and delays $\tau_k$ that are uniformly and independently distributed over the maximum delay spread $L \cdot T$, the probability distribution function for the delays is:

$$p(\tau_i) = \begin{cases} \frac{1}{L \cdot T} & 0 \leq \tau_i \leq L \cdot T \\ 0 & \text{otherwise} \end{cases}$$

After the base-band FIR filter, g(t), at the receiver, the received signal is represented as follows:

$$y(t) = x(t) \otimes h(t) \otimes g(t) + n(t) \otimes g(t) + v = f(t) \otimes h(t) + n(t) \otimes g(t) v$$

where n(t) is the white complex Gaussian noise, and $v$ is the complex DC offset that need be estimated.

If one assumes that $v$ is also a random independent variable, the received mid-amble once sampled and derotated, can be written as:

$$\tilde{r}(k) = e^{-j\frac{3}{8}k\pi} \int_{-\infty}^{\infty} f(kT-t)h(t) + n(kT-t)g(t) + v\, dt$$

From the above model and estimation theory, the LMMSE estimator of $v$ is:

$$\hat{v} = C_{vr} C_{rr}^{-1} r = Qr$$

where $r = [\tilde{r}(0), \ldots, \tilde{r}(25-L)]^T$ is the received mid-amble vector.

$$C_{vr} = E[v \cdot r^H] = \sigma_v^2 \left[1, e^{j\frac{3}{8}\pi}, \ldots, e^{j\frac{3}{8}(25-L)\pi}\right]$$

is the correlation vector between $v$ and r, where $\sigma_v^2$ is the variance of the DC offset.

$$C_{rr} = E[r \cdot r^H] = C_1 + C_2 + C_3$$

is the covariance matrix of r, where:

$$[C_1]_{m,n} = e^{-j\frac{3}{8}(m-n)\pi} \int_{-\infty}^{\infty} p(t) f(mT-t) f^*(nT-t) dt$$

is the co-variance matrix of training sequence.

$$[C_2]_{m,n} = \sigma_n^2 e^{-j\frac{3}{8}(m-n)\pi} \int_{-\infty}^{\infty} g(mT-t) g^*(nT-t) dt$$

is the co-variance matrix of noise where $\sigma_n^2$ is the noise variance.

$$[C_3]_{m,n} = \sigma_v^2 e^{-j\frac{3}{8}(m-n)\pi}$$

is the co-variance matrix due to DC offset.

With above definitions, the LMMSE DC offset estimation coefficients Q can be calculated or pre-calculated. Three parameters are used in the algorithm. These parameters are: 1) channel memory L+1; 2) noise variance $\sigma_n^2$ that is related to system target signal to noise ratio (SNR); and 3) DC offset variance $\sigma_v^2$. The selection of L+1 is a compromise of the performance between channels with short and long memories. A channel memory with L+1=7 can cover most channels in the GSM specification. After CF DC offset compensation stage, $\sigma_v^2$ is relative constant, and the signal power to DC variance ratio is about 15 dB. At this point, the LMMSE estimator for SNR=15 dB has robust performance.

With two unbiased estimates of DC offset, $\hat{v}_{CF}$ and $\hat{v}_{LMMSE}$, and the correlation matrix of $\hat{v}_{CF}$ and $\hat{v}_{LMMSE}$, $$R = \begin{bmatrix} \sigma_{CF}^2 & c \\ c & \sigma_{LMMSE}^2 \end{bmatrix},$$

where $\hat{v}_{CF}^2$ and $\hat{v}_{LMMSE}^2$ are the estimation error variance of CF and LMMSE, respectively, and $c = E[\hat{v}_{CF} \hat{v}_{LMMSE}]$ is the cross-correlation of these two estimates one only needs to determine coefficients $a=[\alpha_{CF}\ \alpha_{LMMSE}]^T$ to produce a combined DC estimate as defined as follows:

$$\hat{v}_{comb} = \alpha_{CF}\hat{v}_{CF} + \alpha_{LMMSE}\hat{v}_{LMMSE}$$

where the minimum estimation error variance is subject to $a^T s=1$ where $s=[1\ 1]^T$.

The solution is given as follows:

$$a_{opt} = \frac{R^{-1}s}{s^T R^{-1} s}$$

where the minimum variance is:

$$\sigma^2_{opt} = \frac{1}{s^T R^{-1} s}$$

The statistics of $\hat{v}_{CF}$ and $\hat{v}_{LMMSE}$ depend on training sequence (TR), channel, and noise or interference statistics. In the above discussion, the coefficients are adaptively adjusted to different conditions. By limiting the adaptation dimension to SIR, the algorithm is simplified. For other conditions, one may choose to design for the worst case. As shown in FIG. 9, the SIR is estimated after the determining the LMMSE DC offset compensation in order to adaptively choose the combining coefficients.

Figure 10:
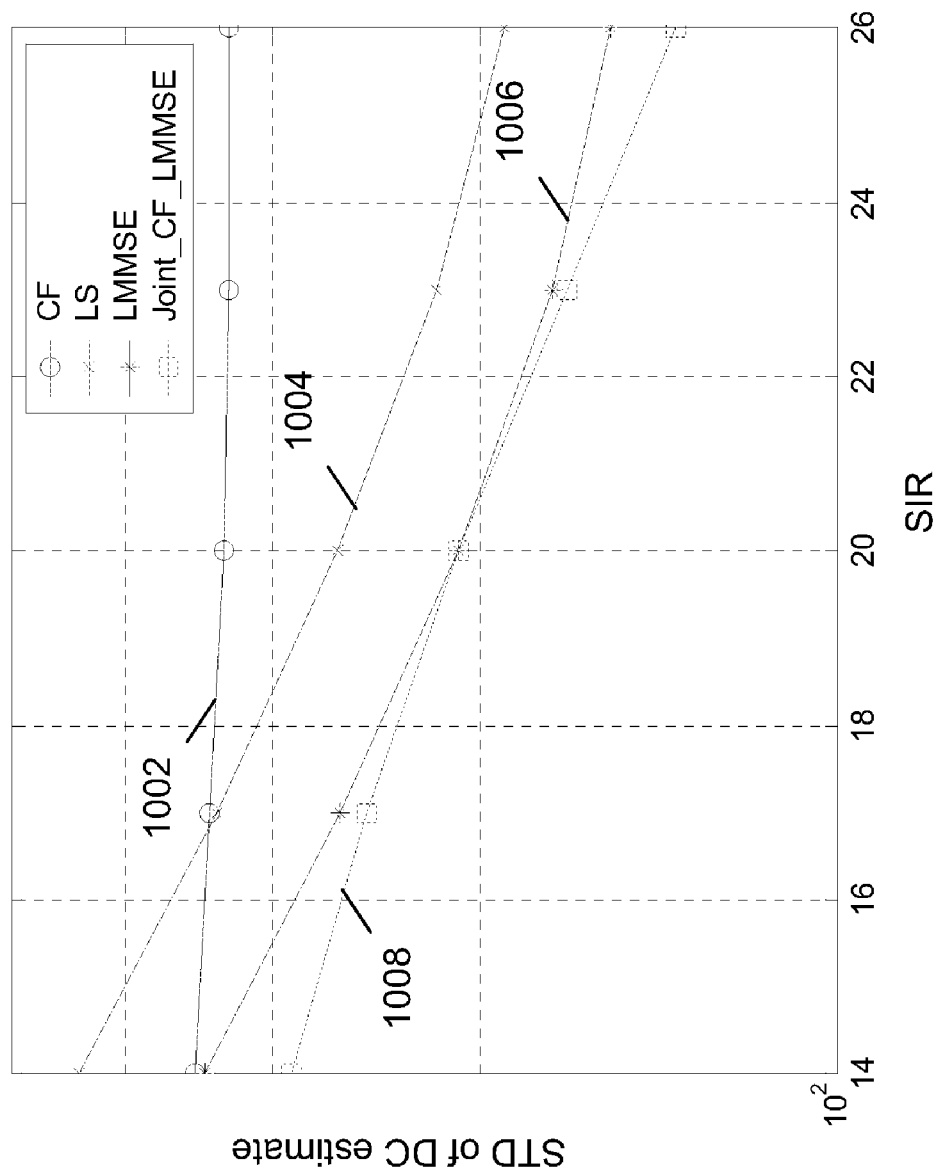
FIG. 10 provides results of different DC offset estimation performance methods.

FIG. 10 provides a comparison of different DC offset estimation performance with different methods. In FIG. 10, the DC offset estimation standard deviation (STD) of CF DC offset 1002, LS DC offset 1004, LMMSE DC offset 1006, and combined CF DC offset and LMMSE DC offset 1008 are presented. In this comparison, one can clearly see that LMMSE DC offset 1008 performs better than LS DC offset 1004. Additionally, the combined CF DC offset and LMMSE DC offset 1008 improves the estimation performance at both low and high SIR regions. The STD of CF DC offset 1002 is quite flat over the SIR axis, while STD of LMMSE DC offset 1006 can reduce quickly with increase of SIR. They also have different correlation in different SIR regions. Thus, to properly combine these DC offsets, one must weight the offsets differently according to their location along the SIR axis. BLUE coefficients vary with SIR.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A DC offset compensator to remove a DC offset from an input signal, wherein the DC offset compensator comprises:
   an average DC estimate and correction stage, wherein the average DC estimate and correction stage receives the input signal and performs DC average compensation;
   a circle fitting (CF) estimation and correction stage operably coupled to the average DC estimate and correction stage, wherein the CF estimation and correction stage performs CF DC offset compensation on an output of the average DC estimate and correction stage;
   a linear minimum mean square error (LMMSE) DC estimation and signal to interference ratio (SIR) estimation stage, wherein the LMMSE DC estimation and SIR estimation stage performs LMMSE DC offset compensation on an output of the CF estimation and correlation stage; and
   a combined DC estimation and correction stage, wherein the combined DC estimation and correction stage produces a combined output signal based on the output of the CF estimation and correction stage and the output of the LMMSE DC estimation and SIR estimation stage.

2. The DC offset compensator of claim 1, wherein the combined DC estimation and correction stage combines the output of the CF estimation and correction stage and the output of the LMMSE DC estimation and SIR estimation stage based on best linear unbiased estimator (BLUE) criterion.

3. The DC offset compensator of claim 1, wherein the combined DC estimation and correction stage adaptively combines the output of the CF estimation and correction stage and the output of the LMMSE DC estimation and SIR estimation stage based on an SIR estimate from the LMMSE DC estimation and SIR estimation stage.

4. The DC offset compensator of claim 1, wherein the input signal comprises a baseband signal within a wireless terminal.

5. The DC offset compensator of claim 4, wherein the baseband signal results from processing received RF burst(s).

6. The DC offset compensator of claim 5, wherein the received RF burst(s) are modulated according to either GMSK or 8PSK.

7. The DC offset compensator of claim 5, wherein the output of the LMMSE DC estimation and SIR estimation stage is based on a modulation format of the received RF burst(s).

8. The DC offset compensator of claim 5, wherein the output of the LMMSE DC estimation and SIR estimation stage is based on a channel estimate associated with the received RF burst(s).

9. A wireless terminal comprises:
a Radio Frequency (RF) front end;
a baseband processor communicatively coupled to the RF front end;
an enCOder/DECoder (CODEC) processing module communicatively coupled to the baseband processor;
wherein, in combination, the RF front end, the baseband processor, and the CODEC processing module are operable to:
receive modulated RF burst(s);
produce a baseband signal from the modulated RF burst(s);
produce an average DC offset estimate from the baseband signal;
produce a circle-fitting (CF) DC offset estimate from the average DC offset estimate;
produce a linear minimum mean square error (LMMSE) DC offset estimate from the CF DC offset estimate;
combine the average DC offset estimate, CF DC offset estimate, and LMMSE DC offset estimate to produce a combined DC offset estimate; and
subtract the combined DC offset estimate from the baseband signal.

10. The wireless terminal of claim 9, wherein the average DC offset estimate, CF DC offset estimate, and LMMSE DC offset estimate are combined based on best linear unbiased estimator (BLUE) criterion.

11. The wireless terminal of claim 9, wherein the average DC offset estimate, CF DC offset estimate, and LMMSE DC offset estimate are adaptively combined based on a signal to interference ratio (SIR) estimate.

12. The wireless terminal of claim 9, wherein the modulated RF burst(s) are modulated according to either GMSK or 8PSK.

13. The wireless terminal of claim 9, wherein the LMMSE DC offset estimate is based on a modulation format of the modulated RF burst(s).

14. The wireless terminal of claim 9, wherein the LMMSE DC offset estimate is based on a channel estimate associated with the modulated RF burst(s).

15. A method to remove DC offset from a baseband signal in a wireless terminal, the method comprises:
producing an average DC offset estimate from the baseband signal;
producing a circle-fitting (CF) DC offset estimate from the average DC offset estimate;
producing a linear minimum mean square error (LMMSE) DC offset estimate from the CF DC offset estimate;
combining the average DC offset estimate, CF DC offset estimate, and LMMSE DC offset estimate to produce a combined DC offset estimate; and
subtracting the combined DC offset estimate from the baseband signal.

16. The method of claim 15, wherein the CF DC offset estimate and LMMSE DC offset estimate are combined sequentially.

17. The method of claim 16, wherein combining the average DC offset estimate, CF DC offset estimate, and LMMSE DC offset is based on best linear unbiased estimator (BLUE) criterion.

18. The method of claim 16, wherein combining the average DC offset estimate, CF DC offset estimate, and LMMSE DC offset is adaptively based on a signal to interference ratio (SIR) estimate.

19. The method of claim 15, wherein the baseband signal results from processing modulated RF burst(s) received by a wireless terminal.

20. The method of claim 19, wherein the modulated RF burst(s) are modulated according to either GMSK or 8PSK.

21. The method of claim 19, wherein the LMMSE DC estimate is based on a modulation format of the modulated RF burst(s).

22. The method of claim 19, wherein the LMMSE DC estimate is based on a channel estimate associated with the modulated RF burst(s).

23. The method of claim 19, wherein the wireless terminal operates according to the GSM standard.

24. A wireless terminal comprises:
a Radio Frequency (RF) front end;
a baseband processor communicatively coupled to the RF front end;
wherein, in combination, the RF front end and the baseband processor are operable to:
receive modulated RF burst(s);
produce a baseband signal from the modulated RF burst(s);
produce an average DC offset estimate from the baseband signal;
produce a circle-fitting (CF) DC offset estimate from the average DC offset estimate;
produce a linear minimum mean square error (LMMSE) DC offset estimate from the CF DC offset estimate;
combine the average DC offset estimate, CF DC offset estimate, and LMMSE DC offset estimate to produce a combined DC offset estimate; and
subtract the combined DC offset estimate from the baseband signal.

25. The wireless terminal of claim 24, wherein the average DC offset estimate, CF DC offset estimate, and LMMSE DC offset estimate are combined based on best linear unbiased estimator (BLUE) criterion.

26. The wireless terminal of claim 24, wherein the average DC offset estimate, CF DC offset estimate, and LMMSE DC offset estimate are adaptively combined based on a signal to interference ratio (SIR) estimate.

27. The wireless terminal of claim 24, wherein the modulated RF burst(s) are modulated according to either GMSK or 8PSK.

28. The wireless terminal of claim 24, wherein the LMMSE DC offset estimate is based on a modulation format of the modulated RF burst(s).

29. The wireless terminal of claim 24, wherein the LMMSE DC offset estimate is based on a channel estimate associated with the modulated RF burst(s).

* * * * *